May 26, 1953      W. J. COSMOS      2,639,560

CONTACT WHEEL

Filed Oct. 2, 1950

INVENTOR.
WILLIAM J. COSMOS
BY
F. D. Prajas

Patented May 26, 1953

2,639,560

UNITED STATES PATENT OFFICE 2,639,560

CONTACT WHEEL

William J. Cosmos, Chicago, Ill., assignor to Chicago Rubber Company, Inc., a corporation of Illinois Application October 2, 1950, Serial No. 187,851

2 Claims. (Cl. 51—141)

This invention relates to contact wheels for grinding, burnishing, buffing, polishing and similar purposes.

It provides a contact wheel which is not only cheaper but at the same time stronger, quieter, steadier and cooler than were the earlier forms of such wheels. It is extremely simple, being composed of only two parts.

A contact wheel has a rubber or generally plastic rim, engaging either loose particles of an abrasive compound, or the inside of a coherent abrasive band. It is driven by a strong metal shaft engaging a more or less rigid hub. It rotates at surface speeds of 5,000 to 10,000 feet per minute, or more, against the resistance of the work piece. Centrifugal forces are applied to the plastic rim in changing, regular and irregular patterns, tending to locally disrupt the contact between the rubber and its support, and in aggravated cases to destroy the rim and endanger personnel and property. It is known that such disruption can be counteracted and prevented by suitable, positive anchorage of the plastic rim in the supporting material. I have designed a contact wheel of the traction type, adapted to engage the inside of an abrasive band, with a rim and anchorage thereof, which is particularly economical to make and efficient to use.

The efficiency of such a wheel depends on a number of features including among others the strength of its hub, the traction and working characteristics of its rim, the firmness of the rim anchorage; also the degree to which the wheel is dynamically balanced to avoid vibrations, noise, chattering and heating up. Vibrations are produced at high speeds by non-symmetrical distribution of mass about the center of rotation, even if the wheel be statically balanced. The new wheel is greatly improved in this respect. It can be safely and simply produced in such form that a simple test of static balance will practically insure dynamic balance even at the most rapid speeds contemplated.

These and other advantages of the invention will be understood on consideration of the detailed description of a preferred embodiment which follows, and which is illustrated in the schematic drawing appended hereto.

Figure 1:
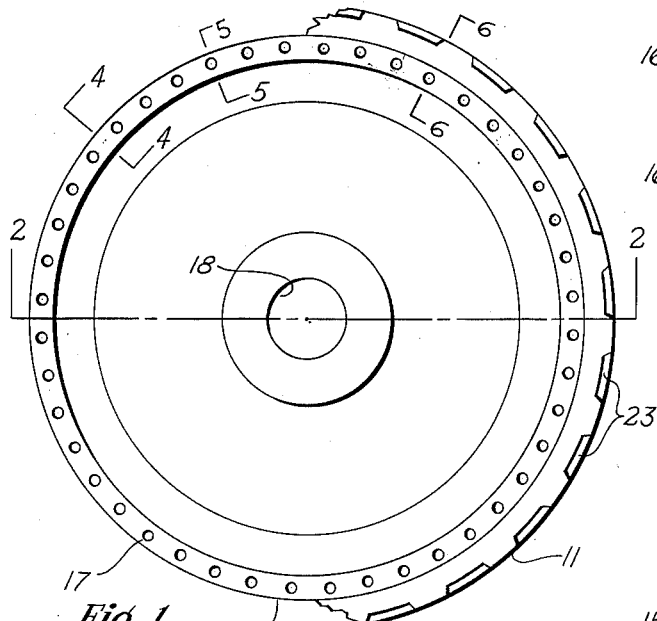
Figure 4:
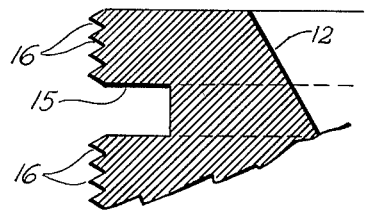
Figure 2:
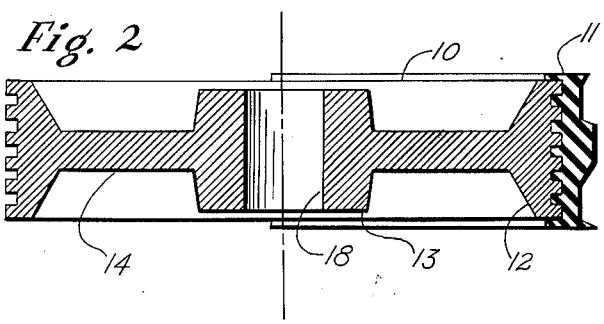
Figure 5:
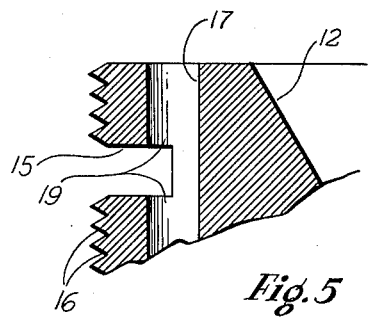
Figure 3:
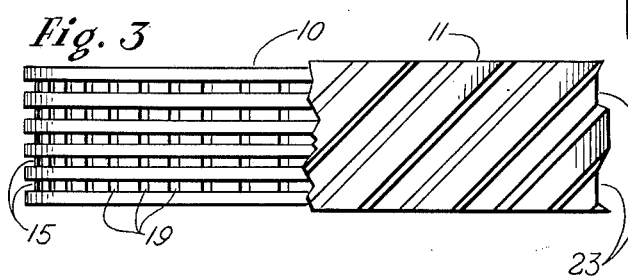
Figure 6:
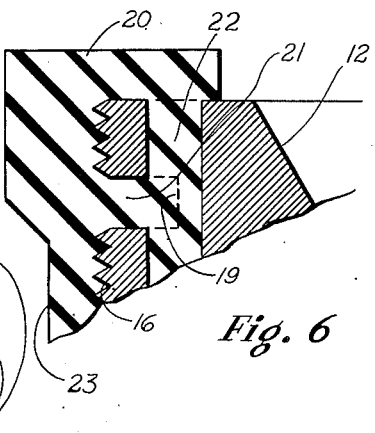

In the drawing, Figure 1 is a side view of a contact wheel in accordance herewith, showing part of the plastic covering removed. Figure 2 is a section along lines 2—2. Figure 3 is an end view of the wheel shown in Figure 1. Figures 4, 5 and 6 are partial sections along lines 4—4, 5—5, 6—6, respectively.

The contact wheel consists of a rigid body 10, desirably formed of a light and homogeneous metal casting, for instance of aluminum alloy and a plastic rim 11, usually molded of a suitable type of rubber.

The body 10 as shown comprises a circular flange 12, a central hub 13, and an intermediate web 14.

The outer surface of the flange 12 is generally cylindrical but has a plurality of parallel circular grooves 15 deeply recessed into the metal. The cross-sectional contour of such grooves can be approximately rectangular. Preferably the flange is roughened by additional, parallel circular grooves 16, less deeply recessed into the metal, which may have for instance, triangular contour.

The flange 12 is perforated by a series of small drill holes 17 extending into and through the flange, parallel with one another and with the large central or axial hole 18. The central hole 18 receives the shaft (not shown), as usual. The peripheral holes 17 which are parallel with the axis, that is, longitudinal with respect to the rim, intersect the larger grooves 15 in the flange 12, thereby forming a series of ports 19 through which these grooves 15 communicate with the holes 17. A section of one such port 19 is shown in Figure 5, and their arrangement in the flange 12 will be seen in Figure 3. The ports form substantially rectangular holes in the inner surfaces of the grooves 15 if the cross-sections of the grooves are rectangular; the drill holes being circular.

The rubber rim 11, as shown in Figure 6, comprises an outer layer 20 surrounding the flange 12, and bonded to the shallow grooves 16 by vulcanizing. On the inside of layer 20 there are parallel peripheral ribs 21, filling the deep grooves 15. On the inside of these ribs there are buttons 22, extending through the port holes 19 and expanding into axially extending holes 17. The layers 20, ribs 21, and buttons 22 form a homogeneous, coherent mass. The buttons 22 anchor the ribs 21, and thereby the covering layer 20 of the rubber rim 11, to the metal of the flange 12, against centrifugal forces tending to separate the covering from the flange.

The outer surface of the rim 11 is desirably crowned if the wheel is intended to engage an abrasive belt. Such crowning is practically required to maintain proper traction with a flat belt at high speeds. The crowning is usually so slight that it is barely noticeable on inspection of the wheel. The preferred outer surface also has serrations 23.

Such serrations are most economically formed by a cutting operation upon the crowned, molded rim surface. The exact pattern of such serrations depends on the type of material to be worked upon in the use of the completed wheel, and the fineness of finish desired for such material. In the great majority of applications it is best to have such serrations extend at an angle with the peripheral edges of the rim, as shown in Figure 3, thereby avoiding shock impacts. I generally make the working edges of the serrations, at the outside surface of the rim, as sharp-cornered as possible; they will then act like files, even when applied through the base material of an abrasive belt driven by the wheel. Chattering marks on the workpiece can be avoided by proper inclination of such sharp-cornered edges with respect to the peripheral rim edges. The serrated wheel surface will usually promote the necessary dissipation of heat, and provide other advantages.

The firm and uniform holding of the crowned, serrated, sharp-cornered plastic rim to the metal support at high speed rotation is one of the important requirements upon a contact wheel. Therefore an essential feature of the metal body 10 consists in the port holes 19 integrally formed in, distributed over, and recessed into the flange 12, which are undercut below the surface of this flange by the holes 17, in order to provide anchorage for the rubber buttons 22. The anchorage for these buttons, and thereby for the rubber or plastic rim in its entirety, is vital for the steady, quiet and safe performance of the wheel under centrifugal load and added load imposed by the pressure of the workpiece. Deep grooves 15 and intersecting drill holes 17 are essential as they provide rectangular or similarly sharp-cornered openings and intersecting, inwardly expanding recesses in the metal, for such anchorage. It will be noted in Figure 3 that the grooves 15 occupy a substantial portion, as shown almost one half, of the outer surface area of the flange 12 (see Figures 2 and 3); likewise, that the intersecting holes 17 are so spaced and intersected that the total area of the resulting ports 19 covers a major portion of said surface area and that said ports are closely spaced from one another by approximately uniform distances peripherally and laterally of the wheel, being arranged in a plurality of circular rows intersected by transverse rows.

For convenience in forming such recesses I prefer machining the grooves 15 as continuous holes, rather than coring or the like. Of course coring, machining and other processes can be combined in some manufacturing shops, suitably equipped.

It depends on a number of variable factors, generally known to persons skilled in the art, which process or combination of processes is most economical.

From an efficiency standpoint I prefer coreless casting. The most homogeneous wheels, which are most efficient from the standpoint of dynamic balance and smooth, quiet operation at high speeds, are produced by casting the metal in a wide, unobstructed mold. Efficient hub, web and flange sections are thus produced. Both grooves 15 and holes 17 can then be formed by machining. When such wheels are statically balanced pursuant to molding and vulcanizing on the rubber, they are dynamically balanced also, without further test. They will run with a minimum of vibration, noise, chattering and heating up even at maximum speed.

This suppression of noise, chattering and heating up is a factor of the utmost importance, since it determines the attainable average speed of the manufacturing process involving the use of contact wheels. Therefore, it is an important feature of the present design that it allows the production of a truly homogeneous flange, which is dynamically balanced with a minimum of difficulty and a maximum of success. This is further promoted by extending the plastic rim 11 not only over the outer but also over the side surfaces of the flange, covering the outer ends of the drilled holes 17 and thereby eliminating screeching noises which are otherwise produced by high-speed rotation of the wheel.

It is also desirable to make the wheel as light and strong as possible. Earlier designs of rubber-coated contact wheels for high speed have provided inwardly expanding anchorage by combining a plurality of metal parts into a built-up body; for instance by securing a wide perforated flange to a narrow web casting. In order to obtain the necessary strong cohesions between the different parts of such a built up wheel, local set screws, rivets, welds, shrink fitting operations, or combinations thereof had to be used. It will be seen by persons skilled in the art, upon consideration of the material and labor costs and other pertinent factors, that the present two part wheel provides a superior combination of lightness, strength, balance, and general economy.

Finally it will be seen, in the light of the present disclosure, that various modifications and improvements can be applied to the preferred form schematically shown, within the scope of my present invention. This scope is defined by my claims, which follow.

I claim:

1. A contact wheel comprising an elastic rim of the traction type to engage successive portions of the inside of an abrasive band and to drive it against the resistance of a workpiece pressed against the portion of the band in contact with the wheel; and a rigid body having the elastic rim molded thereon, the body consisting of a homogeneous casting and comprising a flange which has a generally cylindrical outer surface with a plurality of closely spaced port holes uniformly distributed over said entire surface in a plurality of laterally spaced circular rows intersecting with a plurality of peripherally spaced transverse rows of such holes, the total area of such holes being a major part of the area of said outer surface, each port hole being recessed into and undercut below said outer surface and communicating with another surface of the flange, whereby the plastic rim molded thereon has closely spaced, integral and homogeneous extensions laterally and peripherally distributed over the flange and anchoring the rim to the flange against the forces resulting from said resistance of the workpiece and from a surface speed in the range of about 5000 to 10,000 feet per minute.

2. A contact wheel according to claim 1, the rim of which has an outer surface with serrations therein, said serrations being inclined with respect to the peripheral edges of the rim and having sharp-cornered working edges at the outside surface of the rim.

WILLIAM J. COSMOS.

References Cited in the file of this patent

UNITED STATES PATENTS

| Number | Name | Date |
|---|---|---|
| 35,663 | Bailey | June 24, 1862 |
| 58,027 | Robbins | Sept. 11, 1866 |
| 110,098 | Whitney | Dec. 13, 1870 |
| 170,178 | Locke | Nov. 23, 1875 |
| 628,016 | Model | July 4, 1899 |
| 932,038 | Maier | Aug. 24, 1909 |
| 1,110,804 | Little | Sept. 15, 1914 |
| 1,182,162 | Furber | May 9, 1916 |
| 1,438,098 | Delzell | Dec. 5, 1922 |
| 1,576,924 | Malloy | Mar. 16, 1926 |
| 1,592,043 | Noelting | July 13, 1926 |
| 1,682,899 | Fletcher | Sept. 4, 1928 |
| 1,971,653 | Levoy et al. | Aug. 28, 1934 |
| 2,162,279 | Herchenrider | June 13, 1939 |

FOREIGN PATENTS

| Number | Country | Date |
|---|---|---|
| 520,439 | Great Britain | Apr. 24, 1940 |